United States Patent
McElroy

Patent Number: 5,505,824
Date of Patent: Apr. 9, 1996

[54] PROPELLANT GENERATOR AND METHOD OF GENERATING PROPELLANTS

[75] Inventor: James F. McElroy, Suffield, Conn.

[73] Assignee: United Technologies Corporation, Hartford, Conn.

[21] Appl. No.: 369,246

[22] Filed: Jan. 6, 1995

[51] Int. Cl.$^6$ .............................. C25B 1/04; C25B 9/00; C25B 15/02; C25B 15/08

[52] U.S. Cl. .................. 205/337; 204/262; 204/266; 204/258; 204/257; 205/628

[58] Field of Search ........................... 204/129, 262–266, 204/257–258; 422/189, 234–235, 305

[56] References Cited

U.S. PATENT DOCUMENTS

| | | | |
|---|---|---|---|
| 3,379,634 | 4/1968 | Rutkowsky | 204/266 X |
| 3,520,137 | 7/1970 | Newman et al. | 204/129 X |
| 4,452,676 | 6/1984 | Birbara et al. | 204/129 |
| 4,950,371 | 8/1990 | McElroy | 204/266 X |
| 5,128,003 | 7/1992 | Murdoch et al. | 204/129 |
| 5,362,373 | 11/1994 | Murdoch et al. | 204/242 |

*Primary Examiner*—Donald R. Valentine
*Attorney, Agent, or Firm*—Malcolm J. Chisholm, Jr.

[57] ABSTRACT

A propellant generator is disclosed that automatically adjusts rates of input of lean and excess reactants to compensate for changes in rates of reactions in the generator. In a particular embodiment, the invention generates propellants methane ($CH_4$) and oxygen gas ($O_2$) from a lean reactant carbon dioxide ($CO_2$) and an excess reactant hydrogen gas ($H_2$) utilizing stored hydrogen gas transported to a remote site such as the surface of the planet Mars where carbon dioxide is accumulated and stored. A lean reactant flow controller measures the level of excess reactant passing through a sabatier by measuring a current consumed by an electrochemical separator that separates and pressurizes the excess reactant from a mixture of first propellant, water and excess reactant produced by the sabatier. In response to those measurements, the controller adjusts a flow rate of the lean reactant into the sabatier, thereby automatically controlling proportions of the mixture components so that so that unreacted lean reactants are not stored with the propellants and compensation can be made for unforeseen generator interruptions. A stored excess reactant flow controller measures a level of water separated from the mixture by a gravity phase separator and adjusts a flow rate of stored excess reactant into the sabatier to automatically match a flow rate of diatomic hydrogen ($H_2$) into the sabatier generated by electrolyzing the water separated from the mixture, thereby preventing flooding or emptying of the condensed water in the gravity phase separator.

20 Claims, 2 Drawing Sheets

PROPELLANT GENERATOR AND METHOD OF GENERATING PROPELLANTS

TECHNICAL FIELD

The present invention relates to generation of propellants for powering rockets and/or internal combustion engines, and especially relates to a propellant generator for production of a fuel and oxidant on the surface of the planet Mars, using atmospheric carbon dioxide ($CO_2$).

BACKGROUND OF THE INVENTION

Exploration of outer space requires efficient utilization of propellants that power exploration vehicles. An inherent limitation on a range of potential exploration is the mass of propellants an exploration vehicle must store onboard the vehicle to travel throughout that range: the greater the desired range, the greater the mass of onboard stored propellants, and hence the greater the mass and propulsion requirements of the vehicle. For example, a proposal for manned exploration of the planet Mars with a vehicle susceptible of production in the 1990's has an estimated total flight time (to and from Mars) for such a mission of approximately 1.5 years, with only a 20 day surface stay on Mars. A primary reason the duration of the surface stay is so short, is that the mass of onboard propellant necessary for a trip of such a range prohibits onboard storage of sufficient supplies for life-support systems and/or exploration vehicles needed for extensive exploration of the Martian surface beyond that 20 day stay.

A different proposal has been put forth for space exploration that minimizes requirements for onboard storage of propellants by providing for in situ generation of necessary propellants, as for example generation on the surface of Mars. The proposal is referred to by the phrase "Mars Direct", and is detailed in a publication by R. Zubrin, D. Baker and O. Gwynne entitled *Mars Direct: A Simple, Robust, and Cost Effective Architecture for the Space Exploration Initiative*, AIAA 91-0326, 29th Aerospace Sciences Meeting, Reno, Nev., January 1991, published in 1991 by the American Institute of Aeronautics and Astronautics (hereafter referred to for convenience as the "Zubrin Article"). The Zubrin Article is available to the public by writing to the Institute at 370 L'Enfant Promenade, S.W., Washington, D.C. 20024, and is hereby incorporated herein by reference, as it sets forth aspects of the working environment of the present invention.

In essence, Mars Direct calls for a launch of a first heavy lift booster rocket optimized for Earth escape to deliver to the Martian surface an unmanned and unfueled Earth Return Vehicle ("ERV"). While on the surface, the ERV will fill itself with methane and oxygen propellants generated primarily out of indigenous resources. After the propellant generation is completed, a second heavy lift booster rocket delivers a crew of human explorers to the site on the Martian surface of the ERV to use the generated and stored propellants for extending explorer life support system supplies; for powering exploration vehicles; and, for powering the ERV to deliver the crew back to Earth after an extensive surface stay of approximately 1.5 years. The Mars Direct Architecture also embraces an advantageous unmanned mission to sample Martian soil and/or atmosphere and to return accumulated samples to earth (a "sample return" mission). Such a mission would also benefit from generation of propellants from indigenous resources by minimizing onboard fuel storage requirements thereby enhancing storage capacity for sample access equipment and for samples to be returned to earth.

As detailed in pages 11–15 of the Zubrin Article, the processes for manufacture of propellants methane ($CH_4$) and oxygen ($O_2$) are well known in the art. The peculiarity of the Martian atmosphere that makes in situ production of those propellants practical, or especially coherent as part of the Mars Direct architecture for the Space Exploration Initiative, is that the atmosphere is composed of approximately 95.3% carbon dioxide ($CO_2$). Known earth-based technology has for some time achieved conversion of $CO_2$ to the propellant $CH_4$ by the simple expedient of adding diatomic hydrogen ($H_2$) to the $CO_2$ in the presence of a catalyst such as nickel to produce the well known methanation, or "Sabatier" reaction (hereinafter referred to for convenience as the "Sabatier reaction", or "reaction 1"), which is:

$$CO_2 + 4H_2 = CH_4 + 2H_2O \qquad (1)$$

The Sabatier reaction is exothermic, and will drive itself to produce methane and water ($H_2O$) at a rate that is dependent upon the supply of the reactants carbon dioxide and diatomic hydrogen. It has been in widespread commercial application for many years, wherein the reaction takes place in the presence of an appropriate catalyst housed in a "sabatier unit" examples of which are well known in the art.

As shown in a simplified fluid schematic drawing in FIG. 1, production of the second propellant, diatomic oxygen ($O_2$), results from first separating the water from the methane, as for example by cooling the mixture of methane and water to condense the water and separating the liquid water from the gaseous methane in a common gravity phase separator, and second directing the water into an electrolyzer. In the electrolyzer, the familiar electrolysis reaction takes place (hereinafter referred to for convenience as the "electrolysis reaction" or "reaction 2"), which is:

$$2H_2O = 2H_2 + O_2 \qquad (2)$$

The diatomic hydrogen is then delivered back to the sabatier unit to supplement the original source of hydrogen, while the diatomic oxygen is stored. In the Mars Direct scenario, the ERV would run the aforesaid reaction based upon a stored supply of earth sourced diatomic hydrogen brought to the Martian surface in the ERV, while the carbon dioxide would be extracted directly from the Martian atmosphere, filtered and compressed into storage tanks in the ERV. The resulting methane and diatomic oxygen propellants would be separately stored so that the oxygen could oxidize the methane, and the oxygen could be used separately for life support systems, etc.

As is will known in the art, and as detailed in the Zubrin article at pages 11–15, a significant benefit of generating the methane and oxygen propellants on the Martian surface using atmospheric carbon dioxide is the "mass leverage" that can thereby be obtained for powering the ERV's rockets, and related exploration vehicles. "Mass leverage" refers to the mass of products produced compared to the mass of transported hydrogen. Through use of reactions 1 and 2 in the proposed ERV, a mass leverage of 12:1 can be obtained. It is that substantial advantage that affords the Mars Direct architecture opportunity for extensive surface stays on the Martian surface, as well as for long-range surface exploration through use of exploration vehicles powered by methane/oxygen based internal combustion engines. Such vehicles have a much more favorable power to mass ratio as opposed to exploration vehicles powered by known fuel cell or photovoltaic technology.

Consequently, in situ propellant generation enables Mars Direct to greatly enhance mission capability. In contrast, architectures for the Space Exploration Initiative that do not rely on propellant production based upon indigenous resources require that virtually all mission propellants for exploration and a return trip be stored onboard the exploration vehicle. For an endeavor comparable to a Mars Direct exploratory mission, such requirements would substantially increase the vehicle's size and/or complexity associated with earth orbital assembly; its propulsive requirements; and finally its total cost.

The known applications of reactions 1 and 2 satisfy requirements for generation of methane and oxygen propellants where the commercial applications involve a system that includes regular monitoring of the input rates of the reactants diatomic hydrogen and carbon dioxide and the output rates of the products methane and diatomic oxygen. Monitoring and adjusting those rates affords efficient use of the energy required for a sabatier unit, an electrolyzer and related system components (control valves, pumps, compressors, etc.), and also ensures that relative proportions of the two reactants are properly balanced so that neither is wasted. Additionally, known systems using reactions 1 and 2 are able to separate unreacted carbon dioxide and/or diatomic hydrogen from the stored methane or oxygen products. Additionally, commercial systems are able to quickly make adjustments for fluctuations in reaction and condensation rates of fluids resulting from ordinary fluid dynamics, as for example where the reactant gases are exposed to solid surfaces in the sabatier unit or electrolyzer, or at a gas/liquid phase interface in a condenser), Finally, known systems can also adjust for unforeseen interruptions in reactions 1 or 2, such as through failure of a portion of a sabatier unit or an electrolyzer, or an obstruction in any portion of such a system that effects input rates of the reactants, or output rates of the products.

The Mars Direct application of a system using reactions 1 and 2, however affords no opportunity for a technician to monitor and adjust rates of input and output of the reactants and products in the event of requirements for such adjustments. In particular, where a Mars Direct mission is relying upon a specific amount of stored propellants to return explorers to Earth in the ERV, it is absolutely critical that the propellants achieve a required specific impulse to return the ERV to earth. If the stored propellants, however contain more than trace amounts of unreacted carbon dioxide, diatomic hydrogen or water vapor, the level of performance of the propellants may be inadequate to achieve that specific impulse. Consequently, the rates of input of the reactants must be adjusted to compensate for ordinary fluid dynamics as well as for unforeseen interruptions in system components so that the stored, earth sourced hydrogen is not expended before the requisite product methane is produced; so that excessive carbon dioxide, water vapor and/or diatomic hydrogen is not stored with the propellants; and, so that unnecessary energy is not required to operate the electrolyzer, sabatier unit, and other required system components.

Accordingly, it is the general object of the present invention to provide a propellant generator that overcomes the problems of the prior art.

It is a more specific object to provide a propellant generator that affords automated control of rates of input of reactants into the generator.

It is another object to provide a propellant generator that affords a separate automated control for the rate of input of each reactant entering the generator.

The above and other advantages of this invention will become more readily apparent when the following description is read in conjunction with the accompanying drawings.

Disclosure of the Invention

A propellant generator is disclosed that automatically adjusts rates of input of lean and excess reactants to compensate for changes in rates of reactions in the generator. In a particular embodiment, the invention generates propellants methane ($CH_4$) and oxygen gas ($O_2$) from a lean reactant carbon dioxide ($CO_2$) and an excess reactant hydrogen gas ($H_2$) utilizing stored hydrogen gas transported to a remote site where carbon dioxide is accumulated and stored.

That embodiment of the propellant generator comprises a lean reactant or carbon dioxide storage tank; an excess reactant or hydrogen gas storage tank; a sabatier unit that receives a flow of the carbon dioxide and hydrogen gas from their storage tanks, for reacting them to produce methane and water ($H_2O$) and for passing through the sabatier unit an amount of excess hydrogen gas; a heat exchanger that receives the products of the sabatier unit, for condensing the water out of the methane and water mixture; an electrochemical separator that receives the condensed water, methane and excess hydrogen gas, for separating the excess hydrogen gas and sending it back to the sabatier unit; a gravity phase separator that receives the water and methane from the electrochemical separator, for separating the methane from the water by gravity and sending the methane to a methane storage tank; an electrolyzer that receives the water from the gravity phase separator, for electrolyzing the water to hydrogen gas and oxygen gas and sending the hydrogen gas back to the sabatier unit and for sending the oxygen gas to an oxygen storage tank; a lean reactant flow controller that measures the rate of separation of the excess hydrogen gas separated by the electrochemical separator and controls a lean reactant flow control valve to adjust the flow of carbon dioxide into the sabatier unit in response to those measurements; and, a stored excess reactant flow controller that measures the water level in the gravity phase separator and controls a stored excess reactant flow control valve to adjust the flow of hydrogen gas into the sabatier unit in response to those measurements.

In use of the propellant generator, a specific base amount of excess reactant hydrogen gas is directed into the sabatier with the lean reactant carbon dioxide to make sure all of the carbon dioxide is reacted and no more than trace amounts end up in the propellant storage tanks. By measuring the rate of separation of the excess hydrogen gas in the electrochemical separator and adjusting the flow of carbon dioxide into the sabatier unit in response to those measurements, the lean reactant flow controller automatically compensates for any changes in the rates of the reaction. For example, if the controller measures that more hydrogen is being separated than the base amount of excess hydrogen, then the controller will increase the amount of carbon dioxide flowing into the sabatier unit, thereby causing increased consumption of the hydrogen, until the measurements indicate the base amount of hydrogen is again being separated. In contrast, if the lean reactant flow controller measures less excess hydrogen is being separated than the base amount, then the controller decreases the flow of carbon dioxide into the sabatier unit until separation of the base amount is again achieved. The lean reactant flow controller thereby automatically and effectively prohibits unreacted excess carbon dioxide from entering the propellant storage tanks, while ensuring the propellant generator is operating at its optimal efficiency.

The stored excess reactant flow controller operates in a similar manner to automatically match the rate of supply of electrolysis produced hydrogen gas with the rate of supply of stored hydrogen gas. If the propellant generator is operating perfectly, all but the excess amount of hydrogen in the sabatier unit will be converted into stoichiometric quantities of methane and water so that the water level in the gravity phase separator will remain constant. However, due to ordinary fluid dynamics and unforeseen circumstances such as minor leakage, incomplete condensation of the water vapor, the water level will fluctuate. By controlling the amount of stored hydrogen flowing into the sabatier unit in response to changes in the water level in the gravity phase separator the stored excess reactant flow controller automatically compensates for changes in rates of reactions in the generator for any reason, thereby conserving use of the stored hydrogen, and maintaining efficient operation of the propellant generator.

BEST MODE FOR CARRYING OUT THE INVENTION

Figure 1:
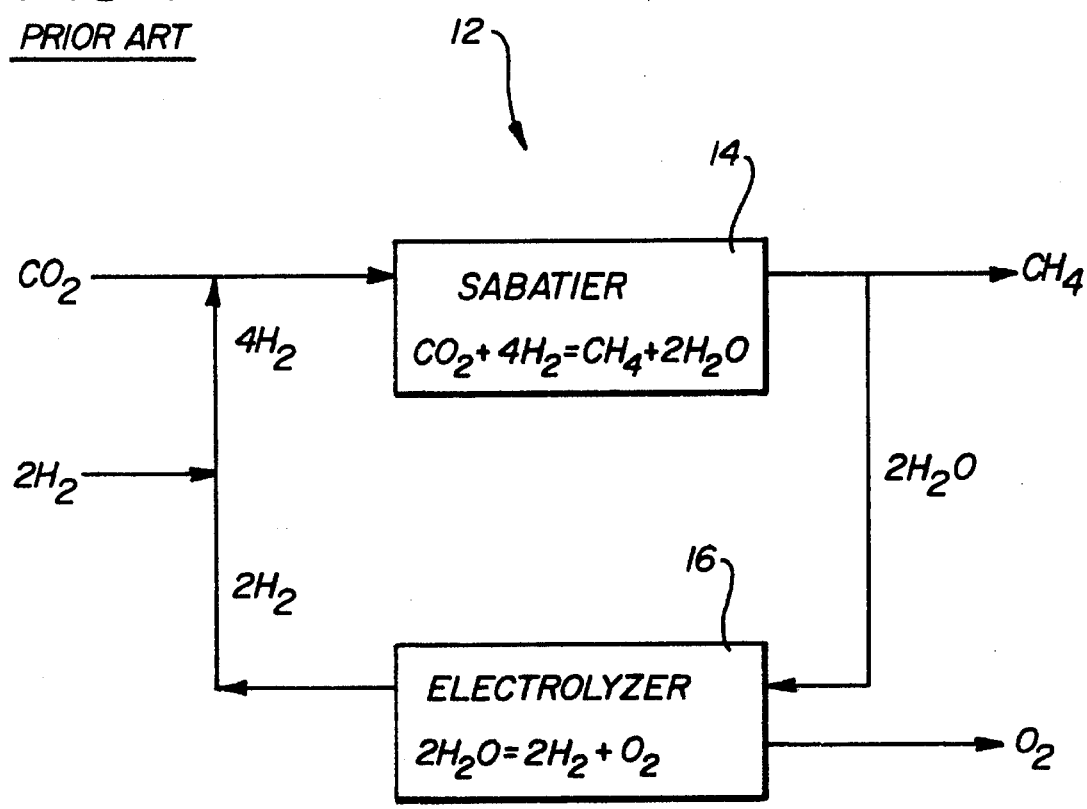
FIG. 1 is a schematic representation of a prior art system for generation of propellants methane ($CH_4$) and oxygen gas ($O_2$) from carbon dioxide ($CO_2$) and hydrogen gas ($H_2$).
Figure 2:
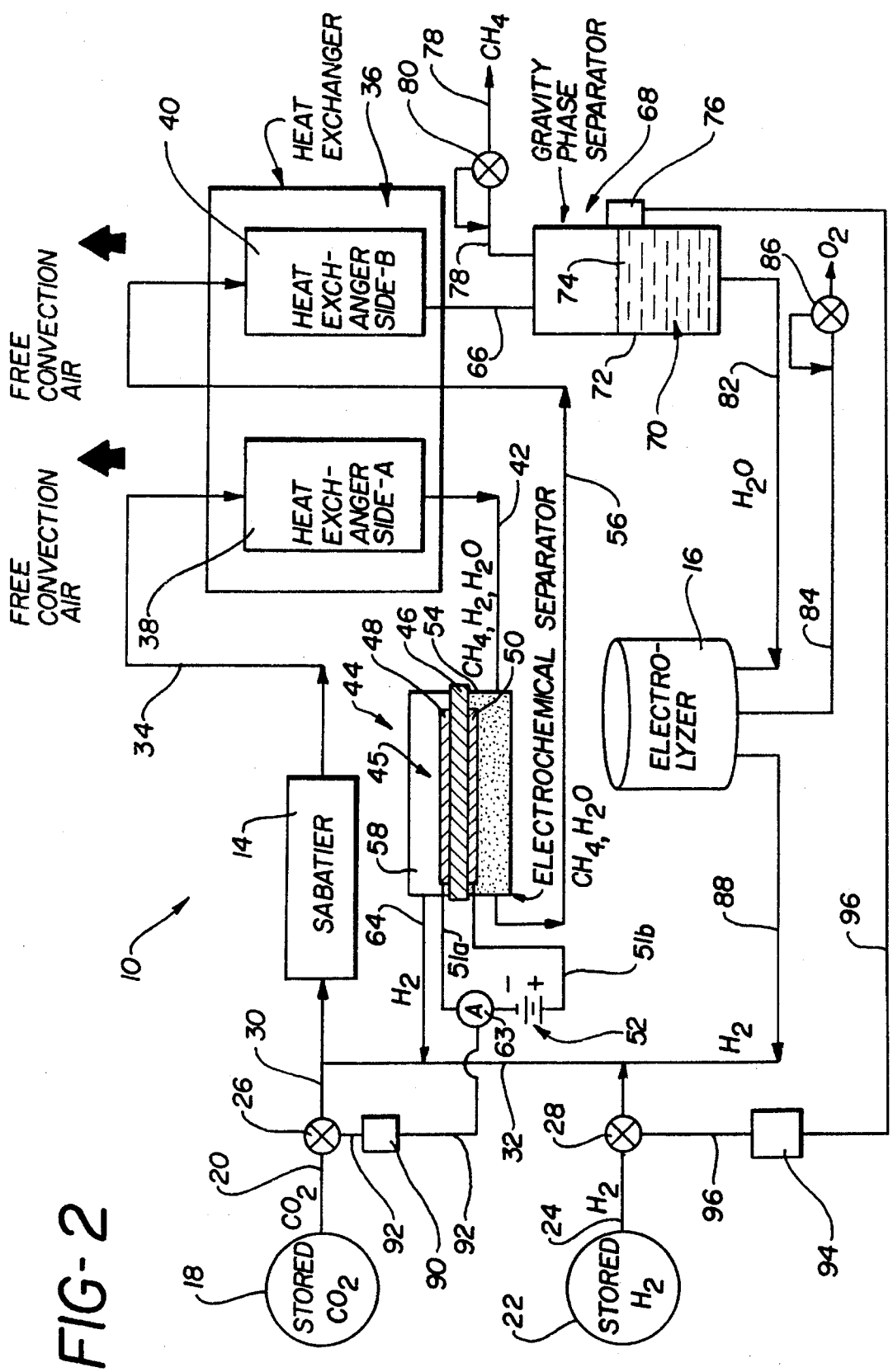
FIG. 2 is a schematic representation of the propellant generator of the present invention for generating propellants methane and oxygen gas from carbon dioxide and hydrogen gas.

Referring to the drawings in detail, a propellant generator of the present invention is shown schematically in FIG. 2, and generally designated by the reference numeral 10. FIG. 1 shows a simplified fluid schematic drawing including key elements of a known prior art system 12 for production of propellants methane ($CH_4$) and diatomic oxygen ($O_2$) from reactants carbon dioxide ($CO_2$) and diatomic hydrogen ($H_2$). (For convenience, hereinafter within this section, methane ($CH_4$) will be referred to as "methane"; diatomic oxygen ($O_2$) will be referred to as "oxygen gas"; carbon dioxide ($CO_2$) will be referred to as "carbon dioxide"; and, diatomic hydrogen ($H_2$) will be referred to as "hydrogen gas".) The prior art system 12 uses a commercial sabatier 14, well known in the art, such as a sabatier described in detail in a publication by G. Kleiner and R. Cusick entitled *Development of an Advanced Sabatier $CO_2$ Reduction System*, 81-ENAs-11, published by the American Society of Mechanical Engineers in 1981, and available to the public by writing to the Society at 345 E. 47th Street, New York, N.Y. 10017, which publication is hereby incorporated herein by reference. The familiar "Sabatier" or methanation reaction is displayed in FIG. 1, and needs no further explanation here. Such a system also includes a standard electrolyzer 16, such as Model No. 9400, manufactured by Packard Instrument Company of Downers Grove, Ill. As with the sabatier 14, the familiar electrolysis reaction as displayed in FIG. 1 is well known and needs no further explanation.

The propellant generator 10 of the present invention shown schematically in FIG. 2, includes a lean reactant delivery means such as a carbon dioxide storage tank 18 and an affixed first carbon dioxide delivery line 20 for storing and delivering a lean reactant such as carbon dioxide, and an excess reactant delivery means such as a hydrogen gas storage tank 22 and an affixed first hydrogen gas delivery line 24 for storing and delivering an excess reactant such as hydrogen gas. Storage tanks 18 and 22, delivery lines 20 and 24, and the subsequently identified tanks and lines of the propellant generator 10 may be standard compressed gas tanks and pipes capable of operating in zero—gravity environments as well as on the martian environment, at operating pressures of 15 psia (pounds per square inch absolute) to 2,000 psia, such tanks and pipes being well known in the art.

The first carbon dioxide delivery line 20 directs the lean reactant carbon dioxide to a lean reactant flow control valve 26 that controls flow rates of the carbon dioxide out of its storage tank 18, and the first hydrogen gas delivery line 24 delivers the hydrogen gas to a stored excess reactant flow control valve 28 that controls flow rates of the hydrogen gas out of its storage tank 22. Flow control valves 26 and 28 may be standard mass control valves well known in the art that electro-mechanically regulate flow rates through the valves. Second carbon dioxide delivery line 30 and second hydrogen gas delivery line 32 direct the carbon dioxide and hydrogen gas respectively into a reactor means for reacting the lean and excess reactants such as sabatier 14 where the carbon dioxide and hydrogen undergo the familiar sabatier reaction described at reference numeral 14 in FIG. 1.

Sabatier discharge line 34 directs sabatier output products methane, water ($H_2O$) (for convenience, hereinafter within this section, water ($H_2O$) will be referred to as "water") and excess hydrogen gas to a heat exchanger means, such as heat exchanger 36, for cooling the output products. Heat exchanger 36 may be a standard condensing heat exchanger such as one that uses ambient free convection air as a cooling fluid, and may be split into two separate sides, such as an A-side 38 and B-side 40 shown schematically in FIG. .2, wherein the same cooling fluid cools two separate passes of sabatier output products. An electrochemical separator feed line 42 directs the cooled sabatier output products from the A-side 38 of the heat exchanger 36 to an electrochemical separator 44.

The electrochemical separator 44 may be the same as an electrochemical separator shown and described in U.S. Pat. No. 4,950,371 to McElroy (the patentee being the inventor of the present invention), issued on Aug. 21, 1990, which Patent is hereby incorporated herein by reference. As described starting at Column 3, line 45 of that Patent, the electrochemical separator 44 (reference numerals used herein are not the same as reference numerals in the '371 patent, but most component terminology of the separator 44 is the same) includes a membrane and electrode assembly 45 having a solid polymer electrolyte membrane 46, which membrane may be made of a sulphonated fluorocarbon, and two opposed platinum electrodes 48, 50 provided on opposed sides of the solid polymer electrolyte membrane 46, across which membrane a DC potential is supplied by wires 51a, 51b to electrodes 48, 50 from a DC power source 52. The electrochemical separator feed line 42 delivers the sabatier output products to an entry chamber 54 of the separator 44, and an electrochemical discharge line 56 directs separator output products methane and water back to the B-side 40 of the heat exchanger 36.

When the DC potential is maintained across the electrolyte membrane 46, the electrode 50 in the entry chamber 54 is positively charged, while the opposed electrode 48 in a hydrogen gas discharge chamber 58 is negatively charged. The positively charged electrode 50 causes each of the excess diatomic hydrogen molecules ($H_2$) in the sabatier output products to disassociate into two hydrogen ions and two electrons. The two electrons enter the electrode, while the two hydrogen ions pass through the electrolyte membrane 46 in a well known process to accept two electrons from the negatively charged electrode 48 to form a diatomic hydrogen molecule, or hydrogen gas ($H_2$), in the hydrogen gas discharge chamber 58 of the electrochemical separator 44. The movement of the electrons in wires 51a, and 51b that supply the DC potential to the electrodes 48, 50, causes an electrical current in the wires that is measured by a current measuring means such as an ammeter 62. The electrochemical separator thereby pressurizes the hydrogen gas accumulated in the discharge chamber sufficiently to inject it into the second hydrogen gas delivery line 32. A first hydrogen gas return line 64 directs the hydrogen gas from the hydrogen gas discharge chamber 58 of the separator 44 back to the sabatier 14 by intersecting with the second hydrogen gas delivery line 32.

The remaining sabatier output products methane and water enter the B-side 40 of the heat exchanger 36 from electrochemical discharge line 56, where the temperature of the output products is further reduced to condense as much of the water out of the methane and water mixture as possible. A heat exchanger discharge line 66 directs the condensed water and methane into phase separation means, such as phase preferential, porous hydrophilic or hydrophobic separators of the aforesaid U.S. Pat. No. 4,950,371 combined with a bellows accumulator with a water level indicator, or such as a gravity phase separator 68, wherein the gaseous methane and liquid water are separated by gravity so that the condensed water forms a water reservoir 70 in a settling tank 72 portion of the gravity phase separator 68. The water reservoir has a discrete level 74 which level is measured by a level measuring means 76 for that purpose, such as a float switch. A typical gravity phase separator that could be used for this purpose is made of Part Nos. 82A491095P01 and 82A491115P05 of Model No. ES1000 SPE® Hydrogen Generator Systems, 100–1000 ZSCFH, manufactured by Hamilton Standard, Inc., of Windsor Locks, Conn. The separated gaseous methane is then directed through a first propellant delivery line 78 to a first propellant back pressure regulator means 80 for maintaining the operating pressures within the propellant generator 10 within a designed operational pressure range, such as 15 psia to 2,000 psia. A standard back pressure regulator that could be used for that purpose is Part No. 82A491100P01, of the above referenced ES1000 SPE® Hydrogen Generator Systems, 100–1000 SCFH. The first propellant delivery line 78 then directs the methane into a first propellant storage means such as a methane storage tank (not shown).

A phase separator discharge line 82 directs the water from the gravity phase separator 68 to an electrolyzing means such as electrolyzer 16, for electrolyzing the water through the familiar electrolysis reaction shown at reference numeral 16 in FIG. 1 into hydrogen gas and oxygen gas. A second propellant delivery line 84 then delivers the oxygen gas from the electrolyzer 16 through a second propellant back pressure regulator 86, similar to the first propellant back pressure 80, for maintaining the operating pressures within the propellant generator 10 within the above designed operational range, and then to a second propellant storage means such as an oxygen storage tank (not shown). A second hydrogen return line 88 directs the hydrogen gas generated in the electrolyzer back to the sabatier by intersecting with the second hydrogen delivery line 32.

A lean reactant flow controller means 90 is in electrical connection through lean controller wire 92 with the current measuring means such as the ammeter 62 and the lean reactant flow control valve 26, and adjusts the valve 26 in response to measurements of that current. A stored excess reactant flow controller means 94 is in electrical connection through excess controller wire 96 with the level measuring means and the stored excess reactant flow control valve 28, and adjusts the valve 28 in response to measurements of the level 74 of the water reservoir 70 in the settling tank 72 of the gravity phase separator 68. Standard electro-mechanical controls well known in the industry may be used to adjust valves 26 and 28 in response to fluctuating electrical currents.

In operation of the propellant generator 10 of the present invention, as shown by the schematic presentation of the sabatier and electrolysis reactions in FIG. 1, it is apparent that the sabatier reaction produces one methane molecule and two water molecules from one carbon dioxide and four diatomic hydrogen molecules. The electrolysis reaction thereafter produces two diatomic hydrogen molecules and one diatomic oxygen molecule. Maximum energy efficiency of the generator, and optimal conservation of the stored hydrogen gas is achieved when the sabatier receives two hydrogen gas molecules from both the stored hydrogen gas and the electrolyzer for each molecule of methane produced. Calculations based upon performance characteristics of the identified electrolyzer 16 and sabatier 14 indicate that an output of 1 kilogram per day of total methane and oxygen production can be achieved upon application of ninety-two (92) cell-amps to the electrolyzer. Although an electrical heater (not shown) applying about 200 watts for approximately 1–5 minutes will be required for sabatier 14 start-up, the exothermic sabatier reaction is more than enough to maintain the sabatier's operating temperature. To maintain production of 1 kilogram per day of total propellant, the electrochemical separator will require 5 to 25 watts of power.

As the propellant generator initiates operation through application of the ninety-two (92) cell-amps to the electrolyzer and application of the heater power to the sabatier, the stored excess reactant flow controller means 94 is set to adjust the stored excess reactant flow control valve 28 to exactly match the flow of stored hydrogen gas (hydrogen gas being the excess reactant in the described embodiment) with the flow of electrolyzer 16 produced hydrogen gas. If the total hydrogen gas required to achieve the desired rate of methane and oxygen production were completely used, the level 70 of water in the gravity phase separator would remain constant. However, ordinary fluid dynamics and unforeseen circumstances such as minor leakages and inconsistent condensation of the water in the heat exchanger 36 will produce fluctuations in the water level indicating alterations in matching of stored hydrogen gas with electrolyzer 16 produced hydrogen gas and/or indicating alterations in the amount of water condensed from the sabatier output products.

The stored excess reactant flow controller means 94 compensates for those alterations in rates of condensed water production by adjusting the stored excess reactant flow control valve in response to signals from the level measuring means 76. If the measuring means indicates the water level has fallen from a base setting of near optimal one-to-one matching of the rates of electrolysis and stored hydrogen gas entering the sabatier 14, the stored excess reactant flow controller 94 adjusts the stored excess reactant flow control valve 28 to increase the flow of stored hydrogen, thereby increasing the resulting amount of water and methane produced by the sabatier 14, until the level measuring means indicates the water level has returned to the base setting. If the level measuring means 76 in contrast indicates the level has increased above the base setting, the stored excess reactant flow controller 94 adjusts the control valve 28 to decrease the flow of stored hydrogen, thereby decreasing the amount of water and methane produced by the sabatier, until the level measuring means indicates the water level has returned to the base setting. The stored excess reactant flow controller 94 thereby also prevents excess water accumulating in and flooding the gravity phase separator 68, and prevents depletion of water or complete emptying of the separator 68

During operation of the propellant generator 10, the lean reactant flow controller means 90 operates to measure the rate of excess reactant, or hydrogen gas in the described embodiment, separated by the electrochemical separator 44 and adjusts the rate of flow of the lean reactant (carbon dioxide being the lean reactant in the described embodiment) into the sabatier 14 as a result of those measurements. By the phrases lean reactant and excess reactant used herein, it is meant that the lean reactant is a reactant that is to be totally converted in the reactor means (or sabatier in the described embodiment), while the excess reactant is a reactant that enters the reactor means at a rate greater than a rate necessary to completely react with all of the lean reactant to convert all of the lean reactant. For example, in the described embodiment, the excess reactant hydrogen gas would enter the sabatier 14 at a rate that is five percent (5%) in excess of a rate necessary to produce the desired one methane and two water molecules from one carbon dioxide molecule and four diatomic hydrogen molecules. Such use of an excess reactant facilitates: a. complete utilization of the lean reactant; b. monitoring of the rate of the reaction in the reactor means; and, c. adjusting the rate of input of the lean reactant to automatically control the processing of reactants to products by the reactor means. The lean reactant flow controller means 90 achieves those goals by measuring the rate of excess reactant separated by the electrochemical separator 44 and adjusting the lean reactant flow control valve 26 in response to those measurements.

For example, when a constant voltage (such as 0.5 to 1.0 DC volts) is applied to the described electrochemical separator 44, the separated hydrogen gas will cause a current consumption in the electrode assembly 45 as measured by the ammeter 62, and the magnitude of that current will be in direct proportion to the proportion of diatomic hydrogen ($H_2$) in the sabatier output products. Upon initiation of operation of the propellant generator 10, the lean reactant flow controller means 90 is set to adjust the lean reactant flow control valve 26 so that the rate of flow of lean reactant (e.g., carbon dioxide) into the sabatier produces total conversion of all but trace amounts of the carbon dioxide into methane and water, while permitting a base amount of excess hydrogen gas (e.g., 5%) to pass through the sabatier into the sabatier output products. If the lean reactant flow controller means 90 detects or measures an increase in the current consumption as measured by the ammeter 62 indicating an increase in the rate of hydrogen gas separated by the electrochemical separator 44, the controller 90 adjusts the lean reactant flow control valve 26 to increase the flow of carbon dioxide into the sabatier 14, thereby causing increased conversion of the excess reactant hydrogen gas, until measurements of the current consumption by the ammeter 62, which measurements evidence the rate of separation of the hydrogen gas from the sabatier output products, indicate the proportion of hydrogen gas in the output products has returned to the base amount of excess hydrogen gas. Similarly, if the controller 90 thereby measures a decrease in the rate of hydrogen gas separated, and hence a decrease in the amount of hydrogen gas in the sabatier output products, the controller adjusts the lean reactant flow control valve 26 to decrease the flow of carbon dioxide into the sabatier 14 until the measurements of separated hydrogen gas indicate the proportion of hydrogen gas in the output products has returned to the base amount of excess hydrogen gas. The lean reactant flow controller means 90 thereby ensures that some excess reactant will be present in the reactor means output products so that transfer of unreacted lean reactant into the propellant storage means is prohibited. In that same manner, the controller 90 also automatically adjusts the rate of input of the lean reactant into the reactor means to achieve control of the processing of the reactants into propellants.

Because the sabatier 14 exothermically processes the reactants, excess heat in the sabatier output products must be removed by the A-side 38 of heat exchanger 36 so that the temperature of the output products is in the range of one-hundred to one-hundred fifty degrees (100°–150°) fahrenheit, the optimal operating temperature range of the electrochemical separator 44. The B-side 40 of heat exchanger 36 then cools the methane and water leaving the separator 44 to thirty-five to forty degrees (35°–40°) fahrenheit to enhance condensation and to minimize water vapor loss without freezing the water. In the relatively cool Martian atmosphere, a proposed working environment of the described embodiment, standard condensing heat exchangers will achieve those temperature change parameters with little difficulty.

While the present invention has been described and illustrated with respect to a particular embodiment of a propellant generator, it will be understood by those skilled in the art that the present invention is not limited to that particular example. Accordingly, reference should be made primarily to the attached claims rather than the foregoing specification to determine the scope of the invention.

I claim:

1. A propellant generator for generating first and second propellants from at least a lean reactant and an excess reactant, comprising:

a. a reactor means in fluid communication with a lean reactant delivery line and an excess reactant delivery line, for reacting all of the lean reactant and all but a base amount of excess reactant into a mixture including a first propellant, water and the base amount of excess reactant;

b. an electrochemical separator having an entry chamber that receives the mixture, and a membrane and electrode assembly adjacent the entry chamber that electrochemically separates and pressurizes the base amount of excess reactant from the mixture into an excess reactant discharge chamber of the electrochemical separator that is in fluid communication with the excess reactant delivery line;

c. a current measuring means in electrical connection with the membrane and electrode assembly, for measuring an amount of excess reactant in the mixture by measuring the current consumed in the electrode assembly by the electrochemical removal of the excess reactant from the mixture, the magnitude of the current being proportionate to the amount of excess reactant separated from the mixture by the electrochemical separator;

d. a phase separation means in fluid communication with the electrochemical separator that receives the water and first propellant from the electrochemical separator, for separating the first propellant from the water and for delivering the first propellant into a first propellant storage means for storage;

e. an electrolyzing means in fluid communication with the phase separation means that receives the water from the phase separator means, for electrolyzing the water into diatomic hydrogen ($H_2$) and the second propellant diatomic oxygen ($O_2$), for delivering the second propellant diatomic oxygen ($O_2$) into a second propellant storage means for storage, and for delivering the diatomic hydrogen ($H_2$) to the excess reactant delivery line; and f. a lean reactant flow controller means in electrical connection with the current measuring means and with a lean reactant flow control valve on the lean reactant delivery line that controls flow rate of the lean reactant into the reactor means, for adjusting the lean reactant flow control valve in response to measurements of the current measured by the current measuring means so that the lean reactant flow controller means automatically controls the proportions of first propellant, water and excess reactant leaving the reactor means by adjusting the lean reactor flow control valve to alter the rate of flow of lean reactant into the reactor means whenever the measuring means measures a current that is not the same magnitude as a desired current consumed by the electrochemical separation of the base amount of excess reactant.

2. The propellant generator of claim 1, wherein the electrochemical separator includes a solid, permeable, nonporous polymer layer sandwiched between two opposed electrodes.

3. The propellant generator of claim 2, wherein the polymer layer is made of sulfonated fluorocarbon.

4. The propellant generator of claim 1, wherein the reactor means comprises a sabatier; the lean reactant comprises carbon dioxide ($CO_2$); and the first propellant comprises methane ($CH_4$).

5. The propellant generator of claim 4, wherein the excess reactant comprises diatomic hydrogen ($H_2$).

6. The propellant generator of claim 1, wherein the phase separation means comprises a gravity phase separator wherein the first propellant being in a gaseous phase is separated from the water by gravity so that the separated water forms a water reservoir having a discrete level in a settling tank of the gravity phase separator, the gravity phase separator having a level measuring means for measuring the level of the separated water in the settling tank.

7. The propellant generator of claim 6, further comprising a stored excess reactant flow controller means in electrical connection with the level measuring means and a stored excess reactant flow control valve on the excess reactant delivery line that controls flow rates of the excess reactant from an excess reactant delivery means for stored excess reactant into the excess reactant delivery line, for adjusting the stored excess reactant flow control valve in response to measurements of the level of the separated water in the settling tank measured by the level measuring means so that the stored excess reactant flow controller means automatically controls the flow rate of stored excess reactant to match a flow rate of diatomic hydrogen ($H_2$) entering the excess reactant delivery line from the electrolyzing means.

8. The propellant generator of claim 1, further comprising a heat exchanger means in fluid communication with the reactor means, the electrochemical separator, and the phase separation means, for cooling the mixture of the first propellant, water and excess reactant.

9. The propellant generator of claim 8, wherein the heat exchanger means comprises a condensing heat exchanger having an A-side in fluid communication with and between the reactor means and electrochemical separator for cooling the mixture of the first propellant, water and excess reactant received from the reactor means, and having a B-side in fluid communication with and between the electrochemical separator and the phase separation means for condensing the water from the mixture of first propellant and water received from the electrochemical separator, so that a single cooling fluid cools both the A-side and B-side, but the mixtures passing through the A-side and B-side do not contact each other.

10. A propellant generator for generating first and second propellants from at least a lean reactant and an excess reactant, comprising:

a. a reactor means in fluid communication with a lean reactant delivery line and an excess reactant delivery line, for reacting all of the lean reactant and all but a base amount of excess reactant into a mixture including a first propellant, water and the base amount of excess reactant;

b. an electrochemical separator having an entry chamber that receives the mixture, and a membrane and electrode assembly adjacent the entry chamber that electrochemically separates and pressurizes the base amount of excess reactant from the mixture into an excess reactant discharge chamber of the electrochemical separator that is in fluid communication with the excess reactant delivery line;

c. a gravity phase separator in fluid communication with the electrochemical separator that receives the water and first propellant from the separator, wherein the first propellant being in a gaseous phase is separated from the water by gravity so that the first propellant is delivered into a first propellant storage means for storage, and the separated water forms a water reservoir having a discrete level in a settling tank of the gravity phase separator, the gravity phase separator having a level measuring means for measuring the level of the separated water in the settling tank;

d. an electrolyzing means in fluid communication with the gravity phase separator that receives the water from the gravity phase separator, for electrolyzing the water into diatomic hydrogen ($H_2$) and the second propellant diatomic oxygen ($O_2$), for delivering the second propellant diatomic oxygen ($O_2$) into a second propellant storage means for storage, and for delivering the diatomic hydrogen ($H_2$) to the excess reactant delivery line; and e. a stored excess reactant flow controller means in electrical connection with the level measuring means and a stored excess reactant flow control valve on the excess reactant delivery line that controls flow rates of the excess reactant from an excess reactant delivery means for stored excess reactant into the excess reactant delivery line, for adjusting the stored excess reactant flow control valve in response to measurements of the level of the separated water in the settling tank measured by the level measuring means so that the stored excess reactant flow controller means automatically controls the flow rate of stored excess reactant to match a flow rate of diatomic hydrogen ($H_2$) entering the excess reactant delivery line from the electrolyzing means.

11. The propellant generator of claim 10, wherein the electrochemical separator includes a solid, permeable, nonporous polymer layer sandwiched between two opposed electrodes.

12. The propellant generator of claim 11, wherein the polymer layer is made of sulfonated fluorocarbon.

13. The propellant generator of claim 12, wherein the reactor means comprises a sabatier; the lean reactant comprises carbon dioxide ($CO_2$); and the first propellant comprises methane ($CH_4$).

14. The propellant generator of claim 13, wherein the excess reactant comprises diatomic hydrogen ($H_2$).

15. The propellant generator of claim 14, further comprising a heat exchanger means in fluid communication with the reactor means, the electrochemical separator, and the gravity phase separator, for cooling the mixture of the first propellant, water and excess reactant.

16. The propellant generator of claim 15, wherein the heat exchanger means comprises a condensing heat exchanger having an A-side in fluid communication with and between the reactor means and electrochemical separator for cooling the mixture of the first propellant, water and excess reactant received from the reactor means, and having a B-side in fluid communication with and between the electrochemical separator and the gravity phase separator for condensing the water from the mixture of first propellant and water received from the electrochemical separator, so that a single cooling fluid cools both the A-side and B-side, but the mixtures passing through the A-side and B-side do not contact each other.

17. The propellant generator of claim 16, further comprising a current measuring means in electrical connection with the membrane and electrode assembly of the electrochemical separator, for measuring an amount of excess reactant in the mixture by measuring the current consumed in the electrode assembly by the electrochemical removal of the excess reactant from the mixture, the magnitude of the current being proportionate to the amount of excess reactant separated from the mixture by the electrochemical separator, and a lean reactant flow controller means in electrical connection with the current measuring means and with a lean reactant flow control valve on the lean reactant delivery line that controls flow rates of the lean reactant into the reactor means, for adjusting the lean reactant flow control valve in response to measurements of the current measured by the current measuring means so that the lean reactant flow controller means automatically controls the proportions of first propellant, water and excess reactant leaving the reactor means by adjusting the lean reactor flow control valve to alter the rate of flow of lean reactant into the reactor means whenever the measuring means measures a current that is not the same magnitude as a desired current consumed by the electrochemical separation of the base amount of excess reactant.

18. A method of generating first and second propellants from at least a lean reactant and an excess reactant comprising the steps of:

a. delivering the lean reactant to a sabatier in a lean reactor delivery line and delivering the excess reactant to the sabatier in an excess reactant delivery line;

b. passing the lean and excess reactants through the sabatier at flow rates so that the sabatier reacts all of the lean reactant and all but a base amount of excess reactant into a mixture including a first propellant, water and the base amount of excess reactant;

c. separating and pressurizing the base amount of excess reactant from the mixture in an electrochemical separator in fluid communication with the sabatier;

d. delivering the separated base amount of excess reactant to the excess reactant delivery line;

e. measuring the base amount of excess reactant separated in the electrochemical separator by measuring an electrical current consumed in the electrochemical separator by the separation of the base amount of excess reactant;

f. separating the water from the first propellant in the mixture of water and first propellant in a gravity phase separator and delivering the separated first propellant to a first propellant storage means;

g. electrolyzing the water separated by the gravity phase separator into diatomic hydrogen ($H_2$) and the second propellant diatomic oxygen ($O_2$) and delivering the second propellant diatomic oxygen ($O_2$) to a second propellant storage means;

h. delivering the electrolyzed diatomic hydrogen ($H_2$) to the excess reactant delivery line; and i. automatically controlling the proportions of first propellant, water and excess reactant leaving the sabatier with a lean reactant flow controller means by adjusting a lean reactant flow control valve, said valve being on the lean reactant delivery line that controls flow rates of the lean reactant into the sabatier, in response to measurements of the electrical current consumed by separation of the excess reactant from the mixture by the electrochemical separator.

19. The method of claim 18, comprising the further step of cooling the mixture of first propellant, water and base amount of excess reactant in a heat,exchanger in fluid communication with the sabatier, electrochemical separator and gravity phase separator.

20. The method of claim 18, comprising the further step of automatically controlling a flow rate of excess reactant entering the excess reactant delivery line from an excess reactant delivery means to match the amount of electrolyzed diatomic hydrogen ($H_2$) entering the excess reactant delivery line with a stored excess reactant flow controller means by adjusting a stored excess reactant flow control valve, said valve being on the excess reactant delivery line to control flow rates of the excess reactant entering the delivery line from the excess reactant delivery means, in response to measurements of a changes in a level of separated water in a settling tank of the gravity phase separator.

* * * * *